United States Patent [19]
Gardner et al.

[11] 3,978,945
[45] Sept. 7, 1976

[54] BRAKE DISC MOUNTING

[75] Inventors: Richard H. Gardner, Pleasant Hill; Robert D. Kelley, Troy, both of Ohio

[73] Assignee: The B. F. Goodrich Company, Akron, Ohio

[22] Filed: Sept. 17, 1974

[21] Appl. No.: 506,714

[52] U.S. Cl. .......................... 188/218 XL; 403/372
[51] Int. Cl.² .......................................... F16D 65/12
[58] Field of Search ............. 188/73.1, 73.2, 18 A, 188/205 A, 218 XL; 192/107 R; 403/365, 372

[56] References Cited
UNITED STATES PATENTS

| | | | |
|---|---|---|---|
| 2,305,768 | 12/1942 | Gente | 403/372 |
| 3,491,860 | 1/1970 | Bricker et al. | 188/218 XL |
| 3,780,834 | 12/1973 | Lottridge et al. | 188/18 A |

FOREIGN PATENTS OR APPLICATIONS

| | | | |
|---|---|---|---|
| 601,351 | 7/1960 | Canada | 403/365 |
| 1,337,146 | 7/1963 | France | 403/372 |
| 364,743 | 1/1932 | United Kingdom | 192/107 R |
| 1,073,147 | 6/1967 | United Kingdom | 403/372 |

*Primary Examiner*—Trygve M. Blix
*Assistant Examiner*—Edward R. Kazenske
*Attorney, Agent, or Firm*—William A. Shira, Jr.

[57] ABSTRACT

A brake disc mounting on a shaft in which a spacer is interposed between the disc and a pilot rib of the shaft to facilitate brake disc removal and reduce disc distortion effects. There may be an opening adjacent the spacer which provides for displacement of a portion of the spacer to accommodate the shrinkage. The spacer itself may provide for displacement caused by disc shrinkage. The spacer may be of a softer material than the disc or be resiliently deformable.

2 Claims, 7 Drawing Figures

U.S. Patent  Sept. 7, 1976  3,978,945

BRAKE DISC MOUNTING

BACKGROUND OF THE INVENTION

This invention relates to the mounting of brake discs on a pilot rib of a shaft and especially to brake discs which are subject to high temperatures causing thermal shrinkage. Such shrinkage makes removal of the brake disc difficult and may cause distortion of the discs. In the past devices have been proposed to prevent binding of the disc on the shaft; however, they have necessitated extensive machining of the disc to build in deformability through a thin wall section. Because the material of the disc is of high strength steel, the thickness of the thin walls and the radial width have been critical dimensions requiring close tolerances and added expense of manufacture. In order to avoid this problem, a thin walled ring of softer metal than the disc metal has been mounted on the disc; however, obtaining the accurate registry with a thin edge of soft material has been difficult because of the tendency of the thin walled member to bend during manufacture and installation.

SUMMARY OF THE INVENTION

The brake disc mounting of this invention is adaptable for registering on an annular pilot rib and has a spacer between the pilot rib and the disc with a width measured in the axial direction of the shaft which is at least as great as the thickness measured in the radial direction of the shaft. An opening adjacent the pilot rib may provide for displacement of a portion of the spacer upon shrinkage of the disc on the pilot rib or the spacer itself may provide for displacement caused by disc shrinkage. With this construction, a minimum of special machining of the disc is required and the spacer has a construction which is not subject to damage during manufacture and installation of the disc so that upon installation an accurate register of the brake disc on the pilot rib is obtained.

The accompanying drawings show one preferred form of the brake disc mounting and four modifications made in accordance with and embodying this invention and which are representative of how this invention may be practiced.

DETAILED DESCRIPTION

Figure 1:
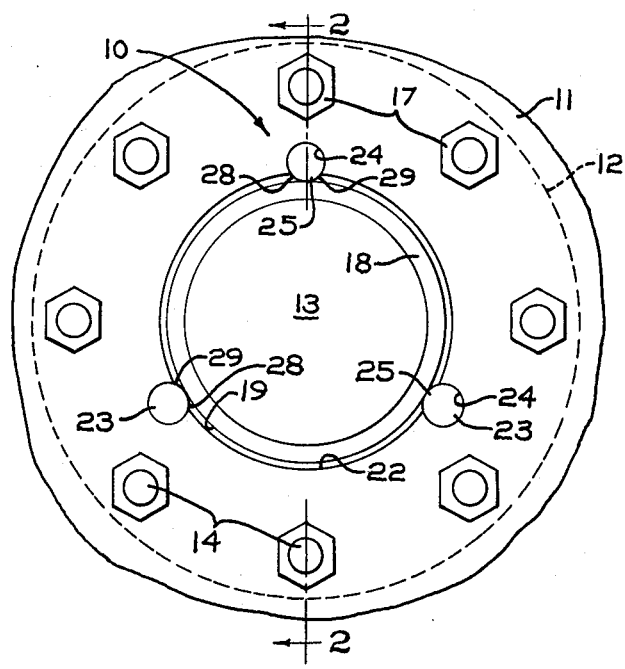
FIG. 1 is a fragmentary side elevation of a brake disc mounting embodying the invention showing the disc mounted in registration with a pilot rib on a shaft.
Figure 2:
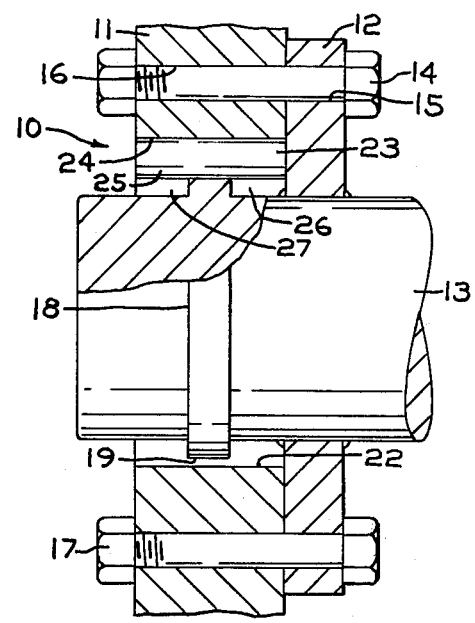
FIG. 2 is a fragmentary sectional view taken along the plane of line 2—2 of FIG. 1 with parts being broken away.

With reference to FIGS. 1 and 2, a brake disc mounting 10 is shown in which a brake disc 11 is mounted on a flange 12 mounted to a shaft 13 by bolts 14 extending through holes 15 and 16 in the flange and brake disc, respectively, with nuts 17 threaded on the ends of the bolts. The holes 15 and 16 and the bolts 14 are of a size to permit a limited amount of relative radial movement of the disc 11 and flange 12 for registering the disc on the shaft 13.

An annular pilot rib 18 on the shaft 13 has a cylindrical register surface 19 which is machined to mount the brake disc 11 in a concentric and balanced condition. An inner peripheral surface 22 of the disc 11 has a diameter greater than the diameter of the surface 19 of the pilot rib 18 and spacer members such as cylindrical pins 23 are mounted in the brake disc 11 to provide a register for the disc on the pilot rib. Preferably the cylindrical pins 23 are driven into holes 24 in the brake disc 11 and are disposed in an axial direction relative to the shaft 13. As shown in FIG. 1, an edge portion 25 of each of the pins 23 projects inwardly from the inner peripheral surface 22 of the brake disc 11 and engages the surface 19 of the pilot rib 18 for registering the disc on the shaft 13. Preferably, the brake disc 11 is of a wear resisting material such as steel and the pins 23 are of a softer deformable material as, for example, copper.

In the manufacture of the brake disc 11 the cylindrical pins 23 are mounted at spaced-apart positions around the inner peripheral surface 22 with the edge portions 25 projecting radially inward a predetermined distance so that upon mounting of the disc 11 on the flange 12, the edge portions 25 will contact the register surface 19 of the pilot rib 18 and locate the disc in a concentric balanced position on the shaft 13. The bolts 14 are then inserted through the holes 15 and 16 and the nuts 17 threaded on the bolts to clamp the brake disc 11 to the flange 12 in torque resisting relationship.

In operation of the brake, the brake disc 11 is subjected to high temperatures which may cause shrinkage of the disc and movement of the inner peripheral surface 22 radially inward towards the shaft 13. With the construction of this invention, openings 26 and 27 may be provided at each side of the pilot rib 18 and openings 28 and 29 between the pins 23 and the register surface 19 are provided into which portions of the pins 23 may be displaced and thereby reduce the effects of the distortion of the brake disc 11. Then upon removal of the brake disc 11 from the pilot rib 18 the soft material of the cylindrical pins 23 may be further displaced or the pins pushed out of the holes 24 with a minimum amount of force on the brake disc to pull the brake disc axially away from the flange 12 after the nuts 17 are removed from the bolts 14.

It is understood that three or more cylindrical pins 23 may be spaced around the inner peripheral surface 22. Also the cylindrical pins 23 may be tapered for easier removal and installation of the disc 11 in accordance with the invention. The pins 23 may also have a rectangular or triangular cross section.

Figure 3:
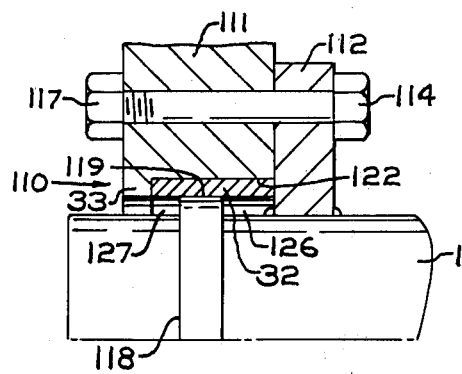
FIG. 3 is a fragmentary sectional view like FIG. 2 of the mounting portion of a modification of the invention.

Referring to FIG. 3, a modification in which the brake disc mounting 110 includes a brake disc 111 mounted on a flange 112 welded to a shaft 113 is shown. The shaft 113 has a pilot rib 118 with a cylindrical register surface 119. The disc 111 has an inner peripheral surface 122 spaced from the register surface 119 on the pilot rib 118. An annular spacer member such as a sleeve 32 having an outer diameter substantially the same as the diameter of the inner peripheral surface 122 and an inner diameter the same as the diameter of the register surface 119 is mounted on the brake disc 111. The sleeve 32 may be circumferentially continuous or have an axially extending slot for ease of manufacture and installation. A flange 33 at one side of the disc 111 retains the sleeve 32 in position while the flange 112 to which the disc is held by bolts 114 and nuts 117 retain the sleeve in position. Preferably, the pilot rib 118 engages an axially central position of the sleeve 32 providing spaces 126 and 127 at each side of the pilot rib into which the material of the sleeve may be displaced upon shrinkage of the disc 111. Preferably, the sleeve 32 is of a softer material than the material of the disc 111 and may, for example, be of copper. The disc 111 is usually of a wear resisting material such as steel.

Figure 4:
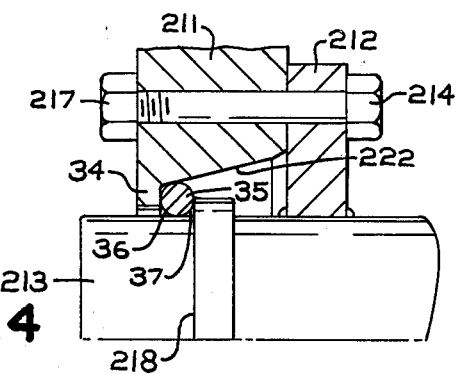
FIG. 4 is a fragmentary sectional view like FIG. 2 of the mounting portion of a further modification of the invention.

Referring to FIG. 4, a further modification is shown in which the disc 211 of a wear resisting material such as steel has a tapered inner peripheral surface 222 with a flange 34 at the edge having the smallest diameter. A ring 35 having a circular cross section is located between the flange 34 and the pilot rib 218 with an inner periphery engaging the surface of shaft 213 and the outer periphery engaging the tapered surface of inner peripheral surface 222. The ring 35 may be circumferentially continuous or be broken by a slot. The bolts 214 extend through flange 212 and disc 211 with nuts 217 threaded on the bolts for urging the flange 34 and inner peripheral surface 222 into engagement with the ring 35 and biasing the ring against the pilot rib 218. The outer periphery of the ring 35 acts as a register for the disc 211.

Upon heat shrinkage of the disc 211, the ring 35 which is of a soft material such as copper, will be displaced into openings 36 and 37 adjacent the flange 34 of the disc and adjacent the pilot rib 218 decreasing the effects of thermal distortion and preventing binding of the disc on the rib. Upon removal of the disc 211, the inner peripheral surface 222 will slide off the ring 35 because of the tapered surface of the inner peripheral surface and the soft material of the ring.

Figure 5:
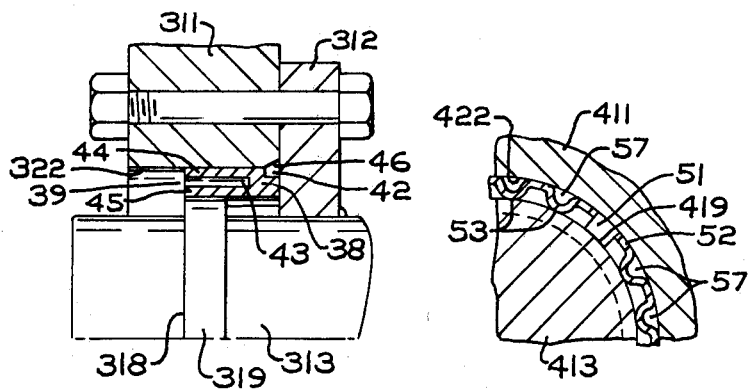
FIG. 5 is a fragmentary sectional view like FIG. 2 of the mounting portion of another modification of the invention.

Referring to FIG. 5, a resiliently deformable spacer member such as ring 38 is located between the brake disc 311 and the pilot rib 318. The outer diameter of the ring 38 is equal to the diameter of the inner peripheral surface 322 of the disc 311. The inner diameter of the ring 38 is equal to the diameter of the register surface 319 of the pilot rib 318 so as to register the disc 311 on the shaft 313. The ring 38 has a width measured in the axial direction of the shaft 313 greater than the thickness measured in a direction radially of the shaft so that an open end 39 is located radially outward of the pilot rib 318 whereas a closed end 42 is in abutment with the flange 312 welded to the axle. The ring 39 may be circumferentially continuous or have an axially extending slot.

At the open end 39 of the ring 38, a groove 43 extending circumferentially of the ring is provided between flanges 44 and 45 extending circumferentially of the ring. The ring 38 may be of a resilient material such as steel and with the groove 43 radially outward of the pilot rib 318 providing an opening into which the flange 44 may be deformed upon thermal shrinkage of the disc 311. To assemble the disc 311 on the mounting, the ring 38 is slipped over the pilot rib 318 so that the closed end 42 engages the flange 312. The disc 311 is then slipped over the annular ring 38 into engagement with the flange 312. An edge 46 of the inner peripheral surface 322 may be beveled, as shown in FIG. 5, to facilitate assembly. Removal of the disc 311 after it has been subjected to heat and there is shrinkage around the pilot rib 318 can be accomplished without difficulty because the deflection of annular flange 44 prevents binding of the inner peripheral surface 322 on the register surface 319 of the pilot rib.

Figure 7:
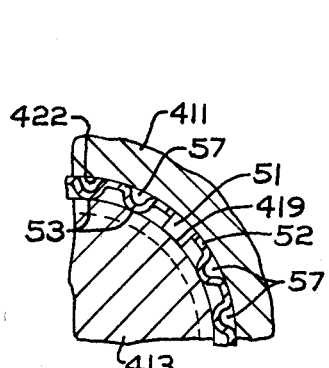
FIG. 7 is a fragmentary sectional view taken along the plane of line 7—7 of FIG. 6 showing the corrugations in the spacer sleeve.
Figure 6:
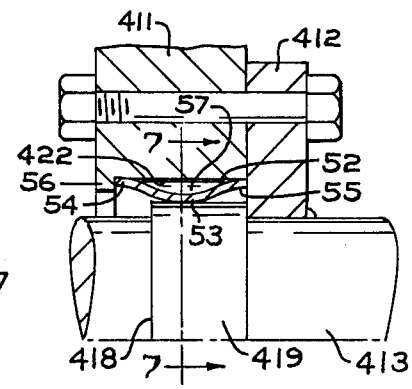
FIG. 6 is a fragmentary sectional view like FIG. 2 of the mounting portion of still another modification of the invention.

Referring to FIGS. 6 and 7, another modification is shown in which a resiliently deformable annular spacer member such as corrugated sleeve 52 is mounted between the pilot rib 418 and the disc 411. The sleeve 52 may be circumferentially continuous or, as shown in FIG. 7, have a slot 51 between the ends to provide for ease of assembly and manufacture. The corrugated sleeve 52 has a central portion 53 having corrugations with an inner diameter equal to the diameter of the register surface 419 of the pilot rib 418. Side portions 54 and 55 at each side of the central portion 53 have an outer diameter equal to the diameter of the inner peripheral surface 422. A flange portion 56 of the disc 411 extending radially inward from the inner peripheral surface 422 can be located at one edge of the sleeve while the other end abuts the flange 412 which is attached to the shaft 413. The corrugated sleeve 52 may be of a resilient material such as steel and when positioned between the pilot rib 418 and disc 411 provides a register of the disc. The corrugated configuration of the sleeve 52 provides openings 57 in the central portion 53 so that upon thermal shrinkage of the disc 411, the sleeve may be resiliently deformed into openings 57 between said pilot rib 18 and said inner peripheral surface 422. In this way, thermal shrinkage of the disc 411 is absorbed and binding of the brake disc on the pilot rib 418 is avoided.

The corrugated sleeve 52 has a width axially of the shaft 413 greater than the thickness measured radially of the shaft and thereby provides a spacer member which is easily manufactured and installed without danger of damage and at the same time provides space for the shrinkage of the disc 411. It is understood that another spacer of deformable resilient material having another configuration may be used following the teachings of this invention.

We claim:

1. A mounting for a brake disc on a shaft having an annular pilot rib for registering said disc comprising a spacer member interposed between said pilot rib and said disc, said spacer member being a resiliently deformable sleeve member with greater resilience than said disc and having a width measured in the axial direction of said shaft at least as great as the thickness measured in the radial direction of said shaft, said sleeve member having central portions with a different diameter than adjacent side portions, said disc having an inner peripheral surface spaced from said pilot rib, said central portions being in engagement with said pilot rib, said side portions being in engagement with said inner peripheral surface of said disc, and said sleeve member being disposed in a position between said pilot rib and said inner peripheral surface to provide an opening located radially of said pilot rib for radial movement of a portion of said sleeve member upon shrinkage of said brake disc on said pilot rib without binding of said disc on said pilot rib.

2. A mounting for a brake disc on a shaft having an annular pilot rib for registering said disc comprising a spacer member interposed between said pilot rib and said disc, said spacer member being a resiliently deformable sleeve member with greater resilience than said disc and having a width measured in the axial direction of said shaft at least as great as the thickness measured in the radial direction of said shaft, said sleeve member having central portions with a different diameter than adjacent side portions, said disc having an inner peripheral surface spaced from said pilot rib, said central portions being first engaging surfaces and said side portions being second engaging surfaces of said sleeve member and at least one of said engaging surfaces being in engagement with said pilot rib and the other of said engaging surfaces being in engagement with said inner peripheral surface of said disc, and said sleeve member being disposed in a position between said pilot rib and said inner peripheral surface to provide an opening located radially of said pilot rib for radial movement of a portion of said sleeve member upon shrinkage of said brake disc on said pilot rib without binding of said disc on said pilot rib.

* * * * *